(12) United States Patent
Demtröder

(10) Patent No.: US 8,978,501 B2
(45) Date of Patent: Mar. 17, 2015

(54) COMPOSITE GEAR PART FOR A GEAR ARRANGEMENT AND A METHOD OF FORMING A COMPOSITE GEAR PART

(75) Inventor: Jens Demtröder, Rønde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/133,847

(22) PCT Filed: Dec. 8, 2009

(86) PCT No.: PCT/EP2009/066616
§ 371 (c)(1),
(2), (4) Date: Jun. 28, 2011

(87) PCT Pub. No.: WO2010/066724
PCT Pub. Date: Jun. 17, 2010

(65) Prior Publication Data
US 2011/0250070 A1  Oct. 13, 2011

Related U.S. Application Data

(60) Provisional application No. 61/121,459, filed on Dec. 10, 2008.

(30) Foreign Application Priority Data

Dec. 10, 2008 (DK) .................................. 2008 01752

(51) Int. Cl.
*F16H 55/12* (2006.01)
*B21D 53/28* (2006.01)
(Continued)

(52) U.S. Cl.
CPC .............. *F16H 55/06* (2013.01); *B23P 11/025* (2013.01); *F03D 11/02* (2013.01);
(Continued)

(58) Field of Classification Search
CPC .......... F16H 55/06; F16H 55/14; F16H 55/17; F16H 55/30; F16H 2055/366; F16F 15/139; F16F 15/1442; F16F 15/13164; F16F 15/1397; F16F 15/134; F16D 3/68; F16D 3/76; F16D 3/74; F16D 3/78; F16D 3/50
USPC .......... 74/434, 443, 446, 574, 412 R; 290/44; 29/893; 464/83, 85, 87, 89, 90
See application file for complete search history.

(56) References Cited

U.S. PATENT DOCUMENTS 1,813,820 A * 7/1931 Ross ................................ 74/443
1,852,538 A * 4/1932 Peterson ......................... 74/443
(Continued)

FOREIGN PATENT DOCUMENTS

EP  0 284 271  9/1988
GB  462 999  3/1937
(Continued)

OTHER PUBLICATIONS

Sanne H. Skovborg; 1st Technical Examination and Search Report issued in priority Denmark Application No. PA 2008 01752; Jul. 1, 2009; 6 pages; Denmark Patent and Trademark Office.
(Continued)

*Primary Examiner* — Justin Krause
(74) *Attorney, Agent, or Firm* — Wood, Herron & Evans, LLP

(57) ABSTRACT

A composite gear part for a gear arrangement includes a shaft part adapted to be rotationally mounted in the gear arrangement, an inner part made from a first material, and an outer part made from a second material. The outer part is fixed circumferentially to the inner part, and the outer part has a plurality of gear teeth formed therein. The outer part must be made from a material which is sufficiently durable and hard to fulfill requirements for gear teeth, but the material of the inner part need not fulfill such requirements. The inner part includes recesses or apertures arranged so that the inner part supports the outer part in an asymmetric manner.

19 Claims, 6 Drawing Sheets

(51) Int. Cl.
*B23P 15/14* (2006.01)
*B21K 1/30* (2006.01)
*F03D 9/00* (2006.01)
*H02P 9/04* (2006.01)
*F16H 55/06* (2006.01)
*B23P 11/02* (2006.01)
*F03D 11/02* (2006.01)
*F16H 55/17* (2006.01)

(52) U.S. Cl.
CPC ...... *F05B 2260/4031* (2013.01); *F05B 2280/5007* (2013.01); *F05C 2251/10* (2013.01); *F16H 55/17* (2013.01); *F16H 2055/065* (2013.01); *Y02E 10/722* (2013.01)
USPC .................................. 74/446; 29/893; 290/44

(56) References Cited

U.S. PATENT DOCUMENTS

| | | | | |
|---|---|---|---|---|
| 2,605,132 | A * | 7/1952 | Watter | 295/7 |
| 3,057,220 | A * | 10/1962 | Parr | 74/443 |
| 3,307,419 | A * | 3/1967 | Brickett et al. | 74/443 |
| 3,651,705 | A * | 3/1972 | Bertinetti et al. | 474/161 |
| 4,070,920 | A | 1/1978 | LeBlanc | |
| 4,178,811 | A * | 12/1979 | Shepherd | 74/574.4 |
| 4,674,351 | A * | 6/1987 | Byrd | 74/443 |
| 4,781,654 | A * | 11/1988 | Walter et al. | 464/89 |
| 4,970,909 | A * | 11/1990 | Pelzer | 74/443 |
| 5,092,192 | A * | 3/1992 | Pelzer | 74/443 |
| 5,272,930 | A * | 12/1993 | Nakamura et al. | 74/434 |
| 5,452,622 | A * | 9/1995 | Fenelon | 74/411 |
| 5,718,140 | A * | 2/1998 | Koestermeier et al. | 72/71 |
| 6,012,350 | A * | 1/2000 | Mizuta et al. | 74/434 |
| 6,095,008 | A * | 8/2000 | Hitomi | 74/446 |
| 6,274,074 | B1 * | 8/2001 | Monie | 264/255 |
| 6,324,930 | B1 * | 12/2001 | Forsyth | 74/446 |
| 6,473,964 | B1 * | 11/2002 | Anderson et al. | 29/888.1 |
| 6,688,153 | B2 * | 2/2004 | Kanamaru et al. | 72/356 |
| 6,755,094 | B2 * | 6/2004 | Rehle et al. | 74/443 |
| 6,868,607 | B2 * | 3/2005 | Kuze et al. | 29/893.34 |
| 6,875,113 | B2 * | 4/2005 | Nichols | 464/90 |
| 7,117,598 | B2 * | 10/2006 | Prucher | 29/893.2 |
| 7,155,995 | B2 * | 1/2007 | Ojima | 74/461 |
| 7,406,891 | B2 * | 8/2008 | Miyasaka | 74/431 |
| 2003/0131678 | A1 * | 7/2003 | Noguchi et al. | 74/434 |
| 2004/0103537 | A1 * | 6/2004 | Kobayashi et al. | 29/893.3 |
| 2006/0073747 | A1 * | 4/2006 | Harada et al. | 440/75 |
| 2007/0221005 | A1 | 9/2007 | Geiman | |
| 2007/0265133 | A1 * | 11/2007 | Smook | 475/317 |
| 2011/0250070 | A1 * | 10/2011 | Demtroder | 416/170 R |

FOREIGN PATENT DOCUMENTS

| | | |
|---|---|---|
| GB | 2 039 662 | 8/1980 |
| GB | 2 123 317 | 2/1984 |
| JP | 58-128562 | 8/1983 |
| JP | 6-109101 | 4/1994 |
| JP | 2003-269553 | 9/2003 |

OTHER PUBLICATIONS

Luciano Meritano; International Search Report and Written Opinion issued in priority International Application No. PCT/EP2009/066616; Mar. 15, 2010; 13 pages; European Patent Office.

Luciano Meritano; International Preliminary Report on Patentability issued in priority International Application No. PCT/EP2009/066616; Jan. 18, 2011; 8 pages; European Patent Office.

* cited by examiner

COMPOSITE GEAR PART FOR A GEAR ARRANGEMENT AND A METHOD OF FORMING A COMPOSITE GEAR PART

FIELD OF THE INVENTION

The present invention relates to a composite gear part, i.e. a gear part which is formed from two or more materials. More particularly, the present invention relates to a gear part, such as a gear wheel, which is suitable for use in a gear arrangement for a wind turbine. Furthermore, the present invention relates to a method of forming such a composite gear part.

BACKGROUND OF THE INVENTION

When manufacturing gears, in particular for large gear arrangements, such as gear arrangements which are suitable for use in drive trains for wind turbines, it is often necessary to manufacture, at least the teeth of the gear wheels, from a wear resistant material in order to prevent damage to the gear wheels, misalignment and uneven loads on the gear teeth during use. Normally, the entire gear wheel is manufactured from the wear resistant material. This is a disadvantage because the wear resistant material is very often expensive and possibly scarce. Accordingly, it is desirable to reduce the amount of wear resistant material used for the gear wheels. Even those expensive and possibly scarce materials as typically used in the industry will typically require an additional thermal treatment or hardening to achieve the desired strength, durability and wear resistance. Having to heat the entire gear wheel, especially for large gears as used in wind turbines, can be a significant contribution to cost, and consumes considerable amounts of energy.

To this end composite gear wheels, i.e. gear wheels which are made from two or more materials, have previously been suggested, the composite gear wheels comprising an inner part made from one material and an outer part made from a different material. The material of the inner part may be a low cost material, and the material of the outer part, which normally has the gear teeth formed therein, may be a more expensive and/or scarce material, fulfilling specific requirements, e.g. regarding durability, hardness, wear resistance, etc.

Examples of composite gear wheels are, e.g., shown in JP 58-128562, GB 462,999, GB 2 039 662, GB 2 123 317 and U.S. Pat. No. 4,070,920.

US 2007/0221005 A1 discloses a forged composite gear and a method of making a forged composite powder metal gear. The forged composite gear includes a plurality of teeth extending from a core, a first section having a first powder metal material, a second section having a second powder material and a variable boundary profile. The variable boundary profile is formed between the first section and the second section, whereby the variable boundary profile exhibits greater tooth wear resistance on the teeth and greater impact resistance in the core. The powder metal material is, thus, arranged on a toothed section formed in the core.

SUMMARY OF THE INVENTION

According to a first aspect the invention provides a composite gear part for a gear arrangement, the composite gear part comprising:

a shaft part adapted to be rotationally mounted in a gear arrangement,
an inner part made from a first material, and
an outer part made from a second material, said outer part being fixed circumferentially to the inner part, and said outer part having a plurality of gear teeth formed therein, wherein the inner part is formed integrally with the shaft part.

The outer part has a plurality of gear teeth formed therein. Thus, the gear teeth of the gear part are formed completely in the outer part which is fixed circumferentially to the inner part. Accordingly, the inner part does not have gear teeth formed therein, contrary to the composite gear disclosed in US 2007/0221005 A1. It is an advantage that the gear teeth are formed entirely in the outer part, because it is thereby obtained that any tooth contact is made by a part which is made entirely from the second material, and very strong teeth can therefore be obtained. Furthermore, this allows the gear teeth to be made in an easier and more precise manner, and it is easier to control a possible post-treatment, e.g. heat treatment, of the gear teeth, because the gear teeth are made from a single material. This is due to the fact that the entire tooth responds in a uniform manner to the post-treatment, and any problems regarding misalignment or distortion due to non-uniform response to a post-treatment are therefore avoided.

The second material is preferably a durable material, such as a kind of steel often used for manufacturing gear wheels. This could, e.g., be a surface hardened high-alloyed steel or a high-alloyed cast iron. Suitable hardening processes include, but are not limited to, case carburizing, nitriding, carbonitriding, or induction hardening. Thereby it is ensured that the part of the gear part having the gear teeth formed therein fulfils requirements with respect to durability, strength, hardness, wear resistance, etc. To this end it is also an advantage that the gear teeth, as well as the part of the gear part arranged immediately adjacent to the gear teeth, are made entirely from the second material.

The first material, on the other hand, does not have to fulfil such requirements, since it is only used for the part of the gear part which does not come into toothed engagement with another gear part. Accordingly, the first material may, e.g., be cast steel, cast iron or a low-alloyed steel.

The outer part is fixed circumferentially to the inner part. This should be interpreted to mean that rotation and/or forces and/or torque can be transferred between the inner part and the outer part. The outer part may be fixed to the inner part by means of a positive fit, e.g. using locking elements, such as keys, splines or dowel pins. Alternatively or additionally, friction fits and/or adhesives or glue may be used. Some suitable methods for fixing the outer part to the inner part are described below with reference to the fourth aspect of the invention. The remarks set forth below are also applicable here.

Since only the outer part needs to be manufactured from the expensive material, the manufacturing costs of the gear part are reduced. Furthermore, in the case that the material of the outer part requires hardening treatment, a smaller part of the gear part requires such treatment, and the manufacturing costs as well as the manufacturing time can thereby be even further reduced. Furthermore, the total weight of the gear part may be reduced. Finally, the inertia of the gear part can be reduced, and this is an advantage when the gear part is used in a wind turbine where rapid load and speed changes are expected. Moreover, the inertia of the gear part can be designed to a desired inertia by adding and/or removing material at specific positions of the inner part, thereby accomplishing a desired resonance behaviour of the gear part. This will be described in further detail below.

The inner part is formed integrally with the shaft part. This is an advantage as compared to a gear part in which the inner part is attached to a shaft part because it is not necessary to provide an accurate fit between the inner part and the shaft part. Such a fit is expensive and difficult to make. Furthermore, a smaller amount of material is required in order to obtain sufficient stiffness of the inner part/shaft part, than would be the case if these were separate parts. Accordingly, the weight as well as the manufacturing costs of the gear part can be further reduced.

The present invention is particularly advantageous for large gear parts, such as gear parts for gears used in drive trains of large wind turbines.

The shaft part is preferably directly supported by one or more bearings.

The outer part is preferably substantially smaller than the inner part, e.g. in terms of total mass and/or in terms of volume and/or in terms of cross sectional area. For instance, when looking at the gear part along an axial direction, the diameter of the inner part may be approximately 90% of the total diameter of the gear part. Thereby the amount of material used for the outer part, i.e. the more expensive material, is minimised.

The outer part may be designed in such a manner that the distance between an inner surface and a valley defined by the gear teeth is approximately twice as long as the distance between a valley and a crest defined by the teeth.

The shape of the inner part, including a possible thickness of an outer rim of the inner part, may advantageously be selected in such a manner that equalization of the pressure distribution between the inner part and the outer part is obtained to the greatest possible extent. Thereby stresses in the gear part are minimised.

The shaft part may be provided with an attachment portion for attaching the shaft part to a rotational gear shaft. The attachment portion may, e.g., be in the form of a flange arranged at an end part of the shaft part, the flange being adapted to be connected to a mating flange arranged at the rotational gear shaft. In this case torque can be transferred between the rotational gear shaft and the shaft part via the flange connection.

As an alternative, the shaft part may be attachable to a rotational gear shaft via a spline connection, e.g. formed on an inner/outer diameter of the shaft part and an outer/inner diameter of the rotational gear shaft.

As another alternative, the shaft part may form a rotational gear shaft. According to this embodiment, the inner part is simply formed directly as a part of a rotational gear shaft, e.g. by means of a casting technique.

Regardless of whether the shaft part is provided with an attachment portion or it forms part of a rotational gear shaft, the rotational gear shaft may be an input gear shaft adapted to supply torque to the gear part, or it may be an output gear shaft, e.g. a sun wheel, adapted to receive torque from the gear part.

The shaft part may be hollow. This allows the total weight of the gear part to be reduced. Furthermore, it allows the inner part/shaft part to be designed to meet certain requirements regarding inertia. This will be described in further detail below.

The inner part may comprise one or more recesses and/or one or more through-going apertures. This also allows the total weight of the gear part to be reduced, and it allows the inertia of the gear part to be designed to meet specific requirements. For instance, recesses and/or through-going apertures may be arranged in such a manner that the inner part supports the outer part in an asymmetric manner. Thereby the gear part becomes 'compliant', allowing it to align with load dependent deflection, in particular allowing the gear part to self-align with a pinion which it is engaged to. When the teeth of the gear part engage with gear teeth of another part, e.g. a pinion, the surfaces of the two sets of teeth may become misaligned, i.e. they may become non-parallel along the contact lines. A number of influence factors may contribute to such a misalignment, including manufacturing tolerances, bearing clearances, bearing deflections, housing deflections, shaft "wind-up", and shaft bending. Some of these influences increase proportionally with the applied load. The misalignment results in an uneven load distribution across the teeth, i.e. one tooth end is caused to bear a larger portion of the load than what it is designed for. One way to compensate for misalignments is 'corrective grinding', i.e. grinding the teeth into a theoretically ideal shape, based on calculations of expected misalignment at a design load. However, since the amount of misalignment varies with the load, the corrective grinding is only ideal at the design load. The recesses and/or through-going apertures may advantageously be designed in such a manner that a load dependent misalignment is obtained, which is equal in size, but opposite in direction to the load dependent misalignment of the gear teeth. Thereby the two load-dependent deflections cancel out, and the resulting load distribution on the gear teeth is no longer influenced by the absolute load level.

Furthermore, designing the recesses and/or through-going apertures carefully, it is possible to obtain a desired dynamic behaviour of the entire drive train. Gearboxes typically contain a large number of rotational resonances. If these resonances coincide with excitations such as the tooth mesh engagement, this may cause increased loading of the components, increased vibration levels, and/or increased noise emissions. The resonance behaviour can be influenced by the shape of the inner part in several different ways: Once, recesses and protrusions can be placed such that the inertia of the entire web gear is modified. The more material is placed towards the outside of the inner part, the higher the inertia, and the lower the resonance frequency (or vice versa: more mass close the rotational axis decreases inertia and raises resonance frequency). Another means to influence the resonance behaviour is by modifying the thickness of the radially extending support structure, and further placing recesses or apertures in this structure such that the torsional stiffness of the gear is modified. Reducing the stiffness will generally lead to lower resonance frequencies (or vice versa, higher stiffness will raise the resonance frequency). As a further means, these recesses or apertures may be provided asymmetrically, such that different stiffness is achieved for each load direction. Any of these means, or a combination hereof, allows to move the resonance frequency to ranges where no excitation frequencies exist.

Finally, through-going apertures in the radially extending support structures can be used for reducing the noise emission of the gearbox. The structure-born noise waves are reflected at the surfaces of the apertures, such that transmission of vibration level transmitted from the gear mesh engagement through shaft, bearing and housing is reduced.

Asymmetric support may, e.g., be obtained by positioning a support structure with an offset relative to the mid plane of the outer part, or by providing the inner part with a specific cross sectional profile, e.g. a Z-like shape, or by supporting the outer part by means of two or more support structures with different thickness.

The inner part may define an interior cavity arranged inside the inner part. According to this embodiment, the total weight of the gear part can be reduced even further. Furthermore, designing the interior cavity carefully allows a desired inertia of the gear part to be obtained. In the case that the shaft part is hollow, the interior cavity may be directly connected to the hollow part of the shaft part.

The inner part may form an end portion of the shaft part. According to this embodiment, the gear part may only be supported by a bearing on one side of the gear part. Thereby the required number of bearings is reduced, and the manufacturing costs, as well as the total weight, are reduced.

According to a second aspect the invention provides a gear arrangement for a wind turbine comprising a composite gear part according to the first aspect of the invention. The gear arrangement may form part of a drive train for a wind turbine. The drive train of a wind turbine includes the parts which ensure that torque is transferred from the hub to an input shaft for the generator. These parts often include a gear arrangement causing the slow rotation of the hub to be converted to faster rotation of the input shaft for the generator.

Thus, according to a third aspect the invention provides a wind turbine comprising a gear arrangement according to the second aspect of the invention.

According to a fourth aspect the invention provides a method of forming a composite gear part, the method comprising the steps of:

providing an inner part made from a first material and a shaft part, said inner part being formed integrally with the shaft part, providing an outer part made from a second material, said outer part having a plurality of gear teeth formed therein, arranging the outer part circumferentially to the inner part, and attaching the outer part onto the inner part.

The composite gear part produced by means of the method according to the fourth aspect of the invention is preferably a gear part according to the first aspect of the invention. Accordingly, the remarks set forth above are also applicable here.

As described above, it is an advantage that the inner part is formed integrally with the shaft part, because it is not necessary to provide an accurate fit between the inner part and the shaft part. Thereby the manufacturing costs are reduced, and a smaller amount of material is required in order to obtain sufficient stiffness of the inner part/shaft part, than would be the case if these were separate parts. Accordingly, the weight of the gear part can be reduced.

The step of attaching the outer part onto the inner part may comprise shrink fitting the outer part onto the inner part. According to this embodiment it is ensured that the outer part is fitted tightly onto the inner part.

The step of shrink fitting the outer part onto the inner part may comprise heating the outer part prior to arranging the outer part circumferentially to the inner part, and allowing the temperature of the outer part to decrease after arranging the outer part circumferentially to the inner part. According to this embodiment the outer part is preferably manufactured with an inner diameter which is slightly smaller than the outer diameter of the inner part. Heating the outer part causes it to expand sufficiently to allow it to be arranged circumferentially to the inner part. When the temperature of the outer part is subsequently allowed to decrease, the outer part shrinks to its original size. Since the inner diameter of the outer part is smaller than the outer diameter of the inner part, elastic deformation of the parts will apply the required contact pressure between the inner part and the outer part. As an alternative, hydraulic oil pressure applied between the parts may be used to achieve the clearance to position the parts.

As an alternative, the step of shrink fitting the outer part onto the inner part may comprise the step of cooling the inner part, thereby shrinking it, prior to arranging the outer part circumferentially to the inner part, and allowing the inner part to obtain its original, higher temperature, and thereby its original size, after the outer part has been arranged circumferentially to the inner part.

When the outer part is arranged circumferentially to the inner part, it is preferably ensured that the outer part is positioned accurately with respect to the inner part. This may, e.g., be obtained by providing the inner part with a protruding section and providing the outer part with a matching groove, or vice versa, thereby ensuring that the outer part can only be slid onto the inner part when the groove is arranged at a position corresponding to the position of the protruding section. Alternatively or additionally, a rim may be arranged on the inner part in such a manner that the outer part can be positioned in abutment with the rim, thereby defining a sideways position of the outer part relatively to the inner part. As another alternative, the inner part and the outer part may be assembled on a tool, e.g. a simple plate, which ensures a correct relative position of the inner part and the outer part.

As an alternative, the inner part may be provided with a substantially conical outer surface, and the outer part may be provided with a substantially conical inner surface. The outer part may then be slided onto the inner part until the conical surfaces abut. Thereby the relative sideways position of the inner part and the outer part is defined. This may be combined with heating and cooling the outer part as described above, or a sufficient contact pressure may be provided solely be moving the inner part and the outer part sideways relative to each other.

It is to be noted that the microgeometry of the fit may slightly deviate from a pure cylinder or cone. In order to achieve an even load distribution across the width of the connection, some kind of crowning or barreling, either convex or concave may be applied to at least one of the two surfaces.

If a hydraulic fit is used, then either of the two parts needs to be equipped with some channels and connectors for the hydraulic equipment used during assembly and disassembly processes.

One advantage of using a hydraulic fit, either alone or in combination with another fitting mechanism, is that it is possible to use the hydraulic mechanism to disassemble the inner part and the outer part. Thereby it is possible to replace the outer part, thereby replacing the gear teeth, e.g. in the case that one or more of the teeth are broken, worn out, damaged, etc.

The method may further comprise the step of increasing the friction between the inner part and the outer part. This may, e.g., be obtained by texturing the surface, or by applying friction enhancing coatings like corundum to at least one of the surfaces. According to this embodiment, a given load can be transferred between the inner part and the outer part with small interference. This makes it easier to control distortions.

Alternatively or additionally, the step of attaching the outer part onto the inner part may comprise the step of applying an adhesive or a glue to the inner part and/or to the outer part. Thereby it can be even further ensured that the outer part and the inner part are attached firmly to each other. Furthermore, it may not be required to heat the outer part prior to arranging it circumferentially to the inner part. Thereby the risk of elastic distortions in the outer part, including the gear teeth, is considerably reduced.

The step of providing an inner part may be performed by means of a casting technique. In this case the inner part and the shaft part are cast integrally in one process.

According to one embodiment, the manufacturing process for a composite gear with a shrink-fitted connection may, in major steps, comprise the following steps. Initially, the inner part is cast (or welded), and manufactured into its final shape. The outer part is pre-turned, then the gear teeth are cut, and the part is heat treated as described above. After heat treat, the inner diameter of the outer part is turned and/or ground to its final shape. The next step is fitting the two parts together, as described above. For a cylindrical fit, this requires either a tool which locates the parts in axial direction until they are fixed, or a recess and abutment which grants the correct position. Finally, the gear teeth are grinded in the assembly.

A critical success parameter to the process described above is controlling distortions of the gear teeth as they arise from the heat treatment as well as elastic deformations as a consequence of the shrink fit. Depending on the dimensions of the outer part, these two distortions may either add or compensate each other. In general, and on a macroscopic scale, these distortions may cause the gear teeth to change their base diameter, change the tooth shape towards larger contact angles and/or change a helix angle, typically towards lower angles. It should be noted that such distortions are not necessarily the same across the tooth width.

It is important to understand such distortions, and to be able to compensate them by manufacturing the outer part in a different shape than what is finally required, such that the gear teeth assume their final shape after heat treat and after assembly of the inner part and the outer part. Furthermore, since only the outer part, rather than the entire gear part, needs heat treatment, it can be expected that the heat treat distortions are reduced in the gear part according to the invention as compared to prior art gear parts.

BRIEF DESCRIPTION OF THE DRAWINGS

The invention will now be described in further detail with reference to the accompanying drawings in which.

DETAILED DESCRIPTION OF THE DRAWINGS

Figure 1:
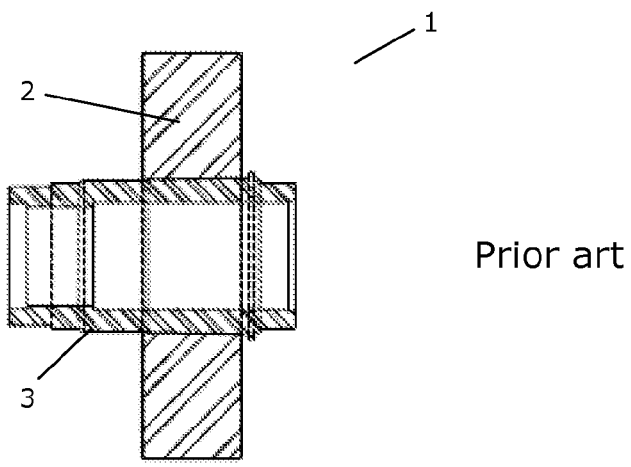
FIG. 1 is cross sectional view of a prior art gear.
Figure 2:
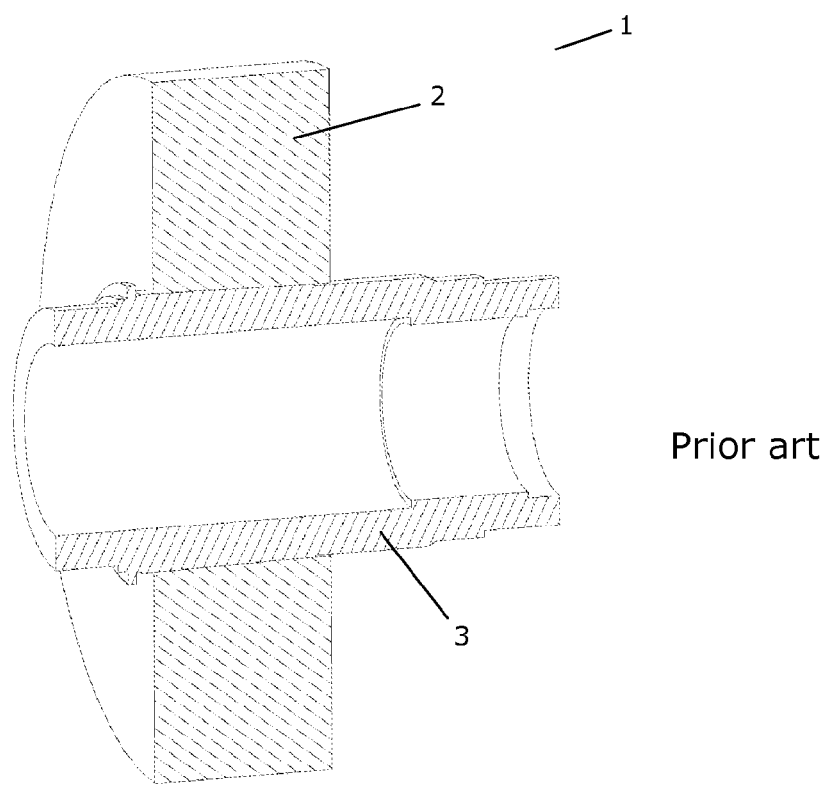
FIG. 2 is a perspective cross sectional view of the prior art gear of FIG. 1.

FIGS. 1 and 2 show a cross sectional view and a perspective cross sectional view of a prior art gear 1. The gear 1 comprises a gear part 2 arranged circumferentially on a shaft part 3 in the form of a hollow shaft. The shaft part 3 may be a rotational shaft or it may be adapted to be attached to a rotational shaft. The gear part 2 is provided with gear teeth (not shown) on its outer perimeter. The gear part 2 is made in one piece. The material used for making the gear part 2 must fulfil the requirements regarding durability, hardness etc. necessary for the toothed part of a gear wheel. The gear part 2 is relatively large, and a large amount of this material, which is often expensive and/or scarce, is required.

Figure 3:
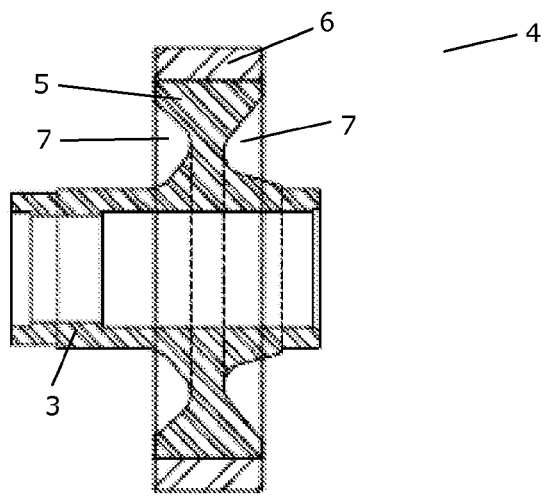
FIG. 3 is a cross sectional view of a composite gear part according to a first embodiment of the invention.
Figure 4:
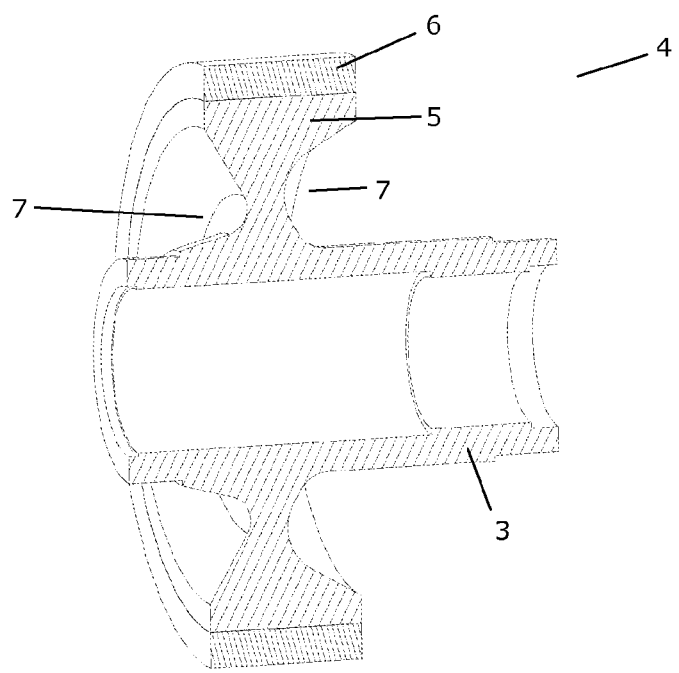
FIG. 4 is a perspective cross sectional view of the composite gear part of FIG. 3.

FIGS. 3 and 4 show a cross sectional view and a perspective cross sectional view of a composite gear part 4 according to a first embodiment of the invention. The composite gear part 4 comprises an inner part 5 and an outer part 6. The outer part 6 is arranged circumferentially to the inner part 5, and it is provided with gear teeth (not shown) on its outer perimeter. The outer part 6 is made from a durable and wear resistant material which is able to withstand the impacts which the teeth of a gear is expected to experience during operation. It could, e.g., be a surface hardened high-alloyed steel or a high-alloyed cast iron. The requirements to the material used for the inner part 5 are somewhat lower than the requirements to the material used for the outer part 6. It is therefore possible to use a less expensive and more readily available material, such as cast steel, cast iron or a low-alloyed steel.

The size of the outer part 6 is much smaller than the size of the inner part 5. Thereby the required amount of the expensive and/or scarce material is minimised.

The inner part 5 is formed integrally with a shaft part 3 in the form of a hollow shaft. The shaft part 3 may be a rotational shaft or it may be adapted to be attached to such a rotational shaft. Since the inner part 5 is formed integrally with the shaft part 3 it is not necessary to fit the inner part 5 to a shaft part 3. Thereby a fitting is avoided, the manufacturing costs are reduced, and a smaller amount of material is required in order to obtain sufficient stiffness of the inner part/shaft part, than would be the case if these were separate parts.

The inner part 5 is provided with recesses 7, i.e. material has been removed as compared to the prior art gear shown in FIG. 1. Thereby the total weight of the composite gear part 4 is reduced. Furthermore, the recesses 7 are arranged and sized in such a manner that the teeth of the outer part 6 are supported asymmetrically. This allows the teeth of the outer part 6 to flex and adjust to loads applied to the toothed rim during operation. This allows the composite gear part 4 to align with load dependent deflection, in particular allowing the gear part to self-align with a pinion which it is engaged to as described above.

Figure 5:
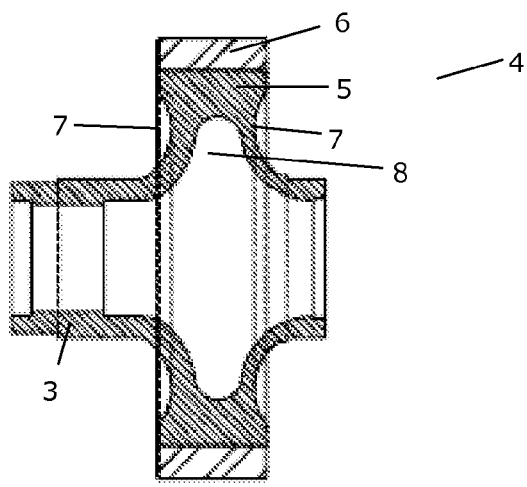
FIG. 5 is a cross sectional view of a composite gear part according to a second embodiment of the invention.
Figure 6:
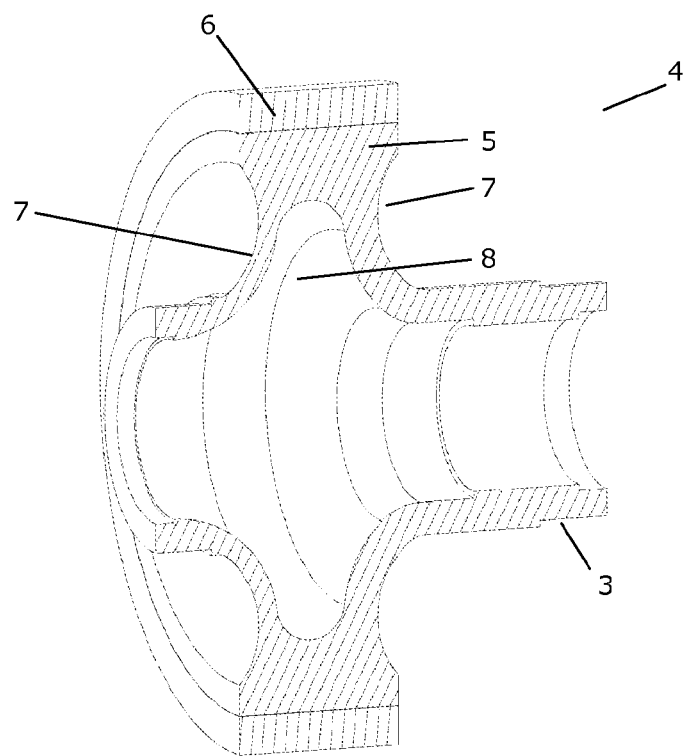
FIG. 6 is a perspective cross sectional view of the composite gear part of FIG. 5.

FIGS. 5 and 6 show a cross sectional view and a perspective cross sectional view of a composite gear part 4 according to a second embodiment of the invention. The composite gear part 4 comprises an inner part 5 formed integrally with a shaft part 3 and an outer part 6, similarly to the embodiment of FIGS. 3 and 4. The remarks set forth above regarding choice of materials, reduction of manufacturing costs, etc. are equally applicable to the embodiment of FIGS. 5 and 6, and these features will not be described in detail here.

The inner part 5 is provided with recesses 7 which are positioned and sized in such a manner that the teeth of the outer part 6 are supported asymmetrically. The advantages described above are thereby obtained. Furthermore, the inner part 5 is provided with a cavity 8 arranged inside the inner part 5. Accordingly, even more material has been removed from the composite gear part 4, thereby reducing the total weight of the composite gear part 4 even further. Furthermore, since the inner part 5 is formed integrally with the shaft part 3 it is possible to provide the cavity 8 in an easy manner and without compromising the stiffness or durability of the composite gear part 4. Designing the inner cavity 8 carefully allows a desired inertia of the composite gear part 4 to be obtained.

Figure 7:
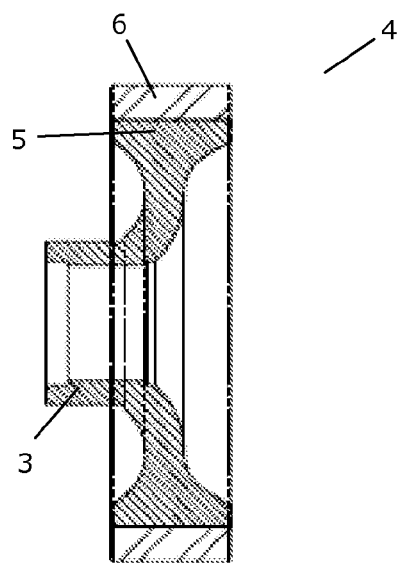
FIG. 7 is a cross sectional view of a composite gear part according to a third embodiment of the invention.
Figure 8:
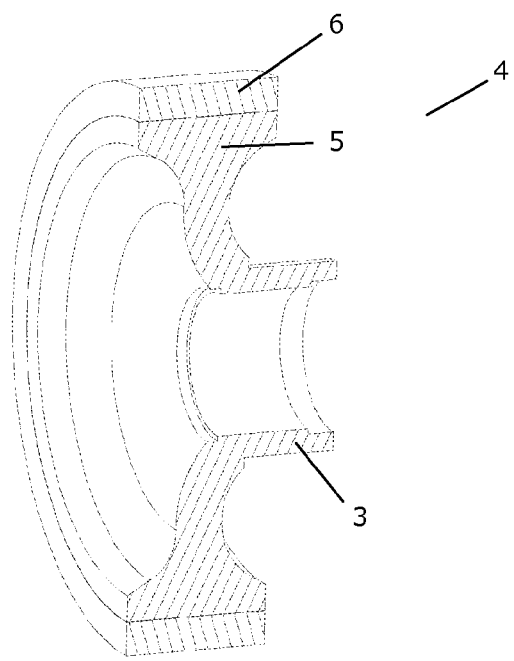
FIG. 8 is a perspective cross sectional view of the composite gear part of FIG. 7.

FIGS. 7 and 8 show a cross sectional view and a perspective cross sectional view of a composite gear part 4 according to a third embodiment of the invention. Similarly to the embodiments shown in FIGS. 3 and 4 and FIGS. 5 and 6, respectively, the composite gear part 4 of FIGS. 7 and 8 comprises an inner part 5 formed integrally with a shaft part 3 and an outer part 6 being provided with gear teeth (not shown) on an outer perimeter. The remarks set forth above with reference to FIGS. 3 and 4 are equally applicable here.

In the embodiment of FIGS. 7 and 8 the inner part 5 is arranged at an end part of the shaft part 3. Accordingly, even more material has been removed from the composite gear part 4, thereby even further reducing the total weight as well as the manufacturing costs.

The inner part 5 is sized and shaped in such a manner that the teeth of the outer part 6 are supported asymmetrically, thereby allowing the teeth to flex and adjust in response to loads applied to the composite gear part 4 during operation.

Since the inner part 5 is arranged at an end part of the shaft part 3, the composite gear part 4 may be supported by a single bearing arrangement arranged at the shaft part side of the composite gear part 4. The embodiments shown in FIGS. 3 and 4 and FIGS. 5 and 6, respectively, will normally be supported by two bearing arrangements, i.e. one on each side of the inner part 5. Accordingly, in the embodiment of FIGS. 7 and 8 the required number of bearings is reduced, thereby reducing the total weight and the manufacturing costs of the composite gear part 4 even further.

Figure 9:
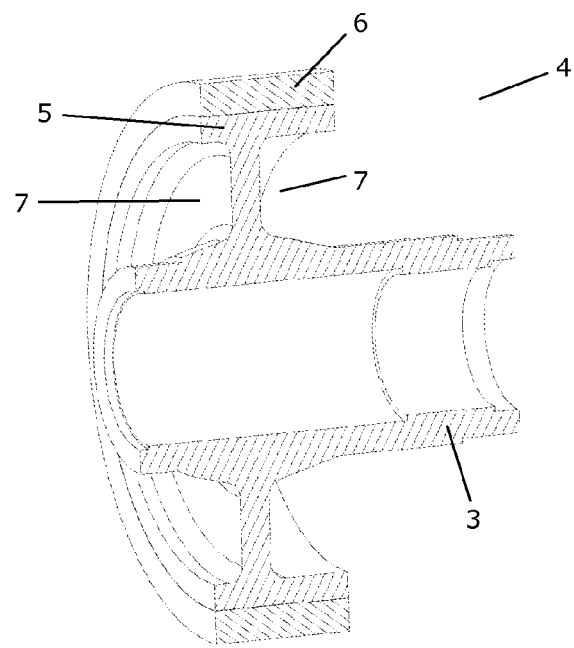
FIG. 9 is a perspective cross sectional view of a composite gear part according to a fourth embodiment of the invention.
Figure 10:
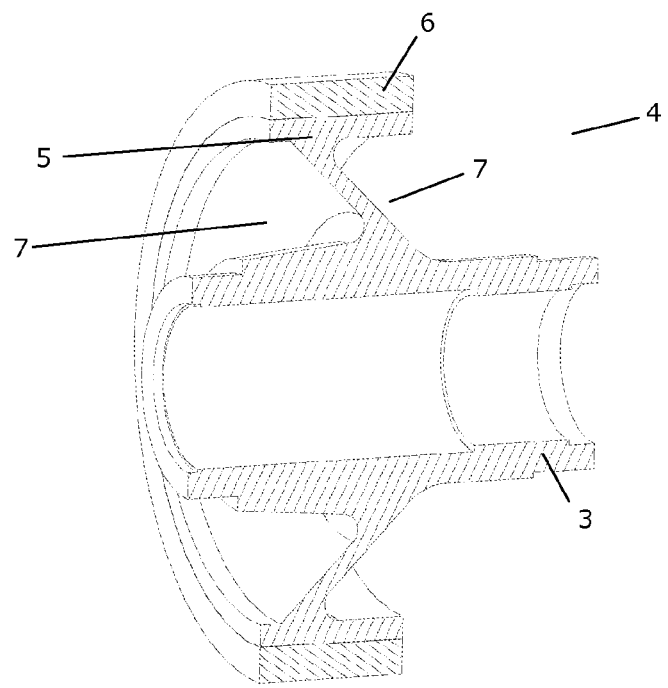
FIG. 10 is a perspective cross sectional view of a composite gear part according to a fifth embodiment of the invention.
Figure 11:
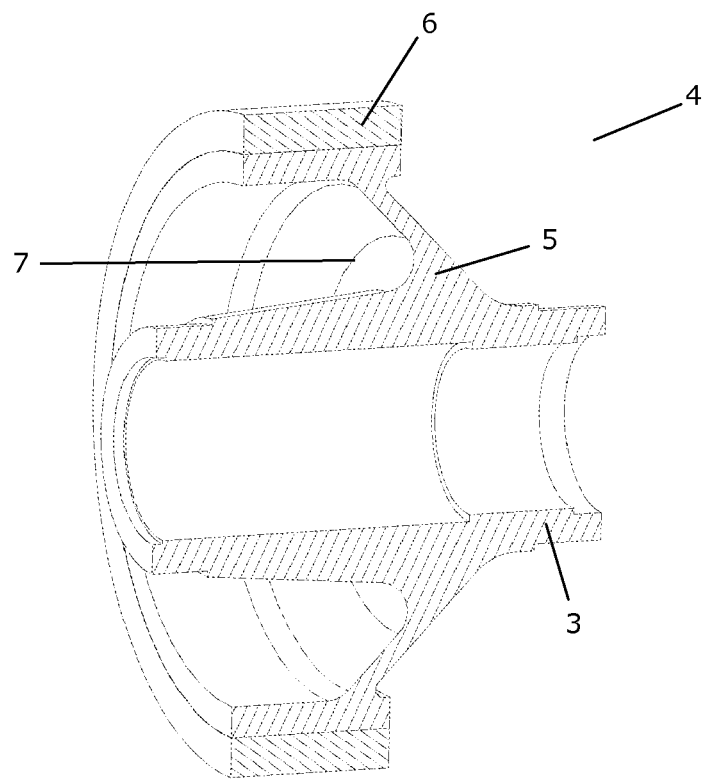
FIG. 11 is a perspective cross sectional view of a composite gear part according to a sixth embodiment of the invention.

FIG. 9 is a perspective cross sectional view of a composite gear part 4 according to a fourth embodiment of the invention. FIG. 10 is a perspective cross sectional view of a composite gear part 4 according to a fifth embodiment of the invention. FIG. 11 is a perspective cross sectional view of a composite gear part 4 according to a sixth embodiment of the invention. Similarly to the previously described embodiments, the composite gear parts 4 of FIGS. 9-11 all comprise an inner part 5 formed integrally with a shaft part 3 and an outer part 6 arranged circumferentially to the inner part 5. The embodiments of FIGS. 9-11 represent various ways of positioning and shaping the inner part 5 in such a manner that the teeth of the outer part 6 are supported asymmetrically. In each of the embodiments one or more recesses is/are formed in the inner part 5.

In FIG. 9 the inner part 5 has a 'T-shape' cross section where the 'vertical' part of the 'T' has been shifted towards the left in the Figure. This is a simple way of providing asymmetrical support for the teeth of the outer part 6. The composite gear part 4 is most compliant towards the right of the Figure.

In FIG. 10 the inner part 5 has a 'Z-shape'. This shape provides a very high degree of flexibility of the inner part 5 without compromising the strength and durability of the composite gear part 4. The composite gear part 4 is most compliant towards the right of the Figure.

In FIG. 11 the inner part 5 defines a substantially conical surface. In this embodiment the composite gear part 4 is highly flexible, and it is most compliant towards the left of the Figure, contrary to the embodiments of FIGS. 9 and 10.

A further advantage of the embodiments shown in FIGS. 10 and 11 is that, assuming that torque is led to the shaft end pointing right in the Figures, then having the web joining the shaft in such a flat angle avoids that the forces have to "flow around the corner", and a smaller stress concentration is achieved, leading to lower stresses and lower weight.

In a number of the described embodiments the teeth of the outer part 6 are supported asymmetrically. As previously described, this has the advantage that the teeth of the outer part 6 are allowed to flex and adjust under loads applied to the composite gear part 4 during operation. It should be noted that this principle could also be applied in gear parts which are not composite gear parts in order to obtain the described flexibility of the gear teeth. Thus, the specific shown shapes of the inner part 5 could be applied in gear parts where the inner part and the outer part 6 are integrated, and where the inner part is possibly attached to the shaft part 3 rather than forming an integral part of it.

The invention claimed is:

1. A composite gear part for a gear arrangement, the composite gear part comprising:
   a shaft part adapted to be rotationally mounted in the gear arrangement about an axis of rotation,
   an inner part made from a first material, and
   an outer part made from a second material, said outer part being formed as a separate member from the inner part and then fixed circumferentially to the inner part, and said outer part having a plurality of gear teeth formed therein,
   wherein the inner part is formed integrally with the shaft part, and wherein the inner part comprises one or more recesses that are each circumferentially symmetrical in all radial directions around the axis of rotation and that are arranged asymmetrically in an axial orientation along the axis of rotation in such a manner that the inner part supports the outer part in an asymmetric manner, the inner part defining a cross section extending between the shaft part and the outer part that is identical in all radial directions around the axis of rotation.

2. The composite gear part according to claim 1, wherein the shaft part is provided with an attachment portion for attaching the shaft part to a rotational gear shaft.

3. The composite gear part according to claim 1, wherein the shaft part forms a rotational gear shaft.

4. The composite gear part according to claim 1, wherein the shaft part is hollow.

5. A composite gear part for a gear arrangement, the composite gear part comprising:
   a shaft part adapted to be rotationally mounted in the gear arrangement, wherein the shaft part is hollow,
   an inner part made from a first material, and
   an outer part made from a second material, said outer part being formed as a separate member from the inner part and then fixed circumferentially to the inner part, and said outer part having a plurality of gear teeth formed therein,
   wherein the inner part is formed integrally with the shaft part, and wherein the inner part comprises one or more recesses that are arranged asymmetrically in such a manner that the inner part supports the outer part in an asymmetric manner,
   wherein the inner part defines an interior cavity arranged inside the inner part, the interior cavity communicating with and projecting outwardly from a hollow portion of the shaft part such that the interior cavity interrupts the shaft part at a location where the interior cavity communicates with and projects outwardly from the hollow portion, wherein the hollow portion extends along an entire length of the shaft part and the interior cavity projects outwardly from the hollow portion along only a portion of the entire length of the shaft part.

6. The composite gear part according to claim 1, wherein the shaft part extends along an axial direction, and the inner part forms an axial end portion of the shaft part such that the shaft part extends in the axial direction away from the inner part in only one direction.

7. A gear arrangement for a wind turbine comprising the composite gear part according to claim 1.

8. The gear arrangement according to claim 7, wherein the gear arrangement forms part of a drive train for the wind turbine.

9. The wind turbine comprising the gear arrangement according to claim 7.

10. The composite gear part according to claim 1, wherein only the outer part includes gear teeth formed therein.

11. The composite gear part according to claim 1, wherein the outer part is sized to be smaller in mass and volume than the inner part.

12. The composite gear part according to claim 1, wherein the inner part includes at least one of the following:
- a T-shaped cross section extending between the outer part and the shaft part, the T-shaped cross section including a vertical part that is located offset from a center of the outer part;
- a Z-shaped cross section extending between the outer part and the shaft part; and
- a substantially conical surface extending between the outer part and the shaft part.

13. A method of forming a composite gear part, the method comprising:
- providing an inner part made from a first material and a shaft part adapted to be rotationally mounted in a gear arrangement about an axis of rotation, the inner part being formed integrally with the shaft part, and the inner part being provided with one or more recesses that are each circumferentially symmetrical in all radial directions around the axis of rotation,
- providing an outer part made from a second material, the outer part formed as a separate member from the inner part, and the outer part having a plurality of gear teeth formed therein,
- arranging the outer part circumferentially to the inner part, in such a manner that the one or more recesses of the inner part are arranged asymmetrically in an axial orientation along the axis of rotation so that the inner part supports the outer part in an asymmetric manner, with the inner part defining a cross section extending between the shaft part and the outer part that is identical in all radial directions around the axis of rotation, and
- attaching the outer part onto the inner part.

14. The method according to claim 13, wherein the step of attaching the outer part onto the inner part comprises shrink fitting the outer part onto the inner part.

15. The method according to claim 14, wherein the step of shrink fitting the outer part onto the inner part comprises heating the outer part prior to arranging the outer part circumferentially to the inner part, and allowing the temperature of the outer part to decrease after arranging the outer part circumferentially to the inner part.

16. The method according to claim 13, further comprising increasing the friction between the inner part and the outer part by performing at least one of the following steps:
- texturing at least one surface defining an abutment between the inner part and the outer part; and
- applying a friction-enhancing coating to the at least one surface defining the abutment between the inner part and the outer part.

17. The method according to claim 13, wherein the step of attaching the outer part onto the inner part comprises the step of applying an adhesive or a glue to the inner part and/or to the outer part.

18. The method according to claim 13, wherein the step of providing the inner part is performed by means of a casting technique.

19. The method according to claim 13, wherein the step of attaching the outer part onto the inner part further comprises:
- fixing the outer part circumferentially onto the inner part in a positive fit using locking elements located at an interface between the outer part and the inner part.

* * * * *